United States Patent [19]

Hertler

[11] Patent Number: 4,605,716

[45] Date of Patent: Aug. 12, 1986

[54] LEWIS BASE-CATALYZED POLYMERIZATION

[75] Inventor: Walter R. Hertler, Kennett Square, Pa.

[73] Assignee: E. I. du Pont de Nemours and Company, Wilmington, Del.

[21] Appl. No.: 701,681

[22] Filed: Feb. 14, 1985

[51] Int. Cl.$^4$ ............................................. C08F 4/16
[52] U.S. Cl. ................................... 526/190; 526/184; 526/192; 526/194
[58] Field of Search ................ 526/184, 190, 192, 194

[56] References Cited

U.S. PATENT DOCUMENTS

| | | | |
|---|---|---|---|
| 3,778,430 | 12/1973 | Citron | 526/194 |
| 4,041,227 | 8/1977 | Uraneck | 526/190 |
| 4,389,514 | 6/1983 | Schmidle | 526/184 |
| 4,414,372 | 11/1983 | Farnham et al. | 526/194 |
| 4,417,034 | 11/1983 | Webster | 526/190 |
| 4,447,628 | 5/1984 | Farnham | 526/194 |

OTHER PUBLICATIONS

C. D. Eisenbach, V. Jaacks, H. Schnecko, and W. Kern, *Makromol. Chem.*, 175, 1329 (1974).

V. Jaacks, C. D. Eisenbach, and W. Kern, *Makromol. Chem.*, 161, 139 (1972).

C. D. Eisenbach, G. Franzmann, V. Jaacks, H. Schnecko, and W. Kern, *Makromol. Chem.*, 175, 1789 (1974).

H. Balard and J. Meybeck, *Eur. Polym. J.*, 13, 611 (1977).

T. Ogawa and P. Quintana, *J. Polym. Sci., Polym. Chem. Ed.*, 13, 2517 (1975).

*Primary Examiner*—Paul R. Michl

[57] ABSTRACT

Polymerization of polar monomers, for example, (meth)acrylates, N,N-dialkyl(meth)acrylamides, (meth)acrylonitrile and mixtures thereof, with selected initiators and selected Lewis base catalysts.

12 Claims, No Drawings

LEWIS BASE-CATALYZED POLYMERIZATION

BACKGROUND OF THE INVENTION

Field of the Invention

This invention resides in a polymerization process which is catalyzed by a Lewis base, and to the polymers produced thereby.

BACKGROUND

U.S. Pat. No. 4,414,372 and U.S. Pat. No. 4,417,034 disclose processes for polymerizing acrylic type or maleimide monomers using certain organosilicon, -tin or -germanium initiators and co-catalysts which are sources of bifluoride, fluoride, cyanide or azide ions or which are suitable Lewis acids.

The literature includes disclosures of the anionic polymerization of acrylonitrile with trialkyl and triaryl phosphine initiators in polar solvents via formation of a zwitterion adduct. The use of a silicon initiator is not disclosed, and a comparison of such-produced polymer with polymer produced by the process of the invention herein is provided in Example 14 which is included in this specification. The literature referred to includes: C. D. Eisenbach, V. Jaacks, H. Schnecko, and W. Kern, *Makromol. Chem.*, 175, 1329 (1974) who disclose initiation of acrylonitrile polymerization by triethylphosphine; V. Jaacks, C. D. Eisenbach, and W. Kern, *Makromol. Chem.*, 161, 139 (1972) who demonstrate that anionic polymerization of acrylonitrile initiated by triphenylphosphine proceeds mainly by transfer to monomer (triphenylphosphine is inoperable as a catalyst in the present invention); C. D. Eisenbach, G. Franzmann, V. Jaacks, H. Schnecko, and W. Kern, *Makromol. Chem.*, 175, 1789 (1974) who disclose that addition of lithium chloride to increase ionic strength leads to formation of macrozwitterions in the initiation of acrylonitrile polymerization with triethylphosphine; H. Balard and J. Meybeck, *Eur. Polym. J.*, 13, 611 (1977) who describe the preparation of acrylonitrile oligomers by initiation with tributylphosphine; and T. Ogawa and P. Quintana, *J. Polym. Sci., Polym. Chem. Ed.*, 13, 2517 (1975) who disclose the initiation of acrylonitrile polymerization with triethylphosphite, which is neither a catalyst nor an initiator in the present invention.

It is an object of this invention to provide a process for poklymerizing (meth)acrylates, (meth)acrylonitrile and N,N-dialkyl(meth)acrylamides. Another object is to provide such a polymerization process which uses an organosilicon initiator disclosed in the aforesaid patents and a Lewis base. Other objects will become apparent hereinafter.

DETAILED DESCRIPTION OF THE INVENTION

The invention resides in the process of polymerizing a monomer selected from (meth)acrylates, N,N-dialkyl(meth)acrylamides, meth(acrylonitrile), and mixtures thereof. More specifically, the invention resides in the polymerization process comprising contacting under polymerizing conditions at least one polar monomer with (i) a polymerization initiator compound comprising a tetracoordinate metal selected from Si, Ge and Sn having at least one activating substituent or activating diradical attached thereto, said substituent or diradical optionally having one or more substituents that are inert under polymerizing conditions, and (ii) a co-catalyst which is a suitable Lewis base, to produce polymer having repeat units of the monomer. Preferably, the polymer is "living" and is characterized by the presence, in the growing and in the grown polymer, of a moiety containing the initiator metal at "living" ends and the activating substituent or diradical, or a tautomer thereof, at non-living ends of said polymer. Still more specifically, monomers which are useful herein are of the formula $CH_2=C(Y)X$ wherein:

X is $-CN$, $-CH=CHC(O)X'$ or $-C(O)X'$;

Y is $-H$, $-CH_3$, $-CN$ or $-CO_2R$, provided, however, when X is $-CH=CHC(O)X'$, Y is $-H$ or $-CH_3$;

X' is $-OSi(R^1)_3$, $-R$, $-OR$ or $-NR'R''$;

each $R^1$, independently, is H or a hydrocarbyl radical which is an aliphatic, alicyclic, aromatic or mixed aliphatic-aromatic radical containing up to 20 carbon atoms, provided that at least one $R^1$ group is not H;

R is a hydrocarbyl radical which is an aliphatic, alicyclic, aromatic or mixed aliphatic-aromatic radical containing up to 20 carbon atoms, or a polymeric radical containing at least 20 carbon atoms, any of said radicals optionally containing one or more ether oxygen atoms within aliphatic segments thereof, optionally containing one or more functional substituents that are unreactive under polymerizing conditions, and optionally containing one or more reactive substituents of the formula $-Z'(O)C-C(Y^1)=CH_2$ wherein $Y^1$ is H or $CH_3$ and Z' is O or NR'; and each R' and R'' is independently selected from $C_{1-4}$ alkyl.

The initiator used in the polymerization of this invention is a silicon-containing initiator of U.S. Pat. Nos. 4,414,372 and 4,417,034, supra, U.S. Pat. Nos. 4,524,196 and 4,508,880 and application Ser. Nos. 660,588, 660,589, 673,926 and 676,099, now abandoned. Application Ser. No. 660,589 was allowed Oct. 28, 1985, now U.S. Pat. No. 4,581,428. Initiators which are preferred for use herein are of the formula selected from $(R^1)_3MZ$, $(R^1)_2M(Z^1)_2$ and $O[M(R^1)_2Z^1]_2$ wherein:

$R^1$ is as defined above;

Z is an activating substituent selected from the group consisting of $-CN$,

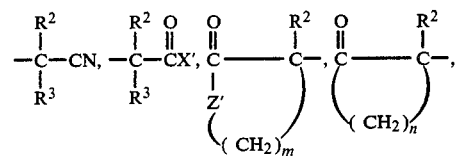

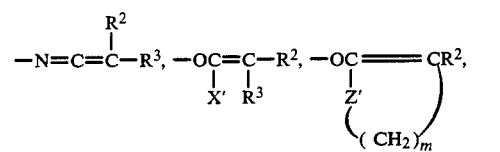

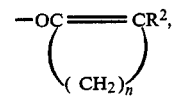

$-SR$, $-OP(NR'R'')_2$, $-OP(OR^1)_2$, $-OP[OSi(R^1)_3]_2$ and mixtures thereof wherein R, $R^1$, R', R'', X' and Z' are as defined above;

$Z^1$ is the activating substituent

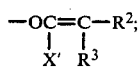

m is 2, 3 or 4;
n is 3, 4 or 5;
M is Si, Sn or Ge, provided, however, when Z

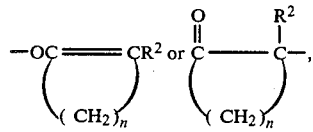

M is Sn or Ge; and
each of $R^2$ and $R^3$ is independently selected from H and hydrocarbyl, defined as for R above;

(a) at least one of any R, $R^2$ and $R^3$ in the initiator optionally containing one or more initiating substituents of the formula $-Z^2-M(R^1)_3$ wherein
M and $R^1$ are as defined above;
$Z^2$ is an activating diradical selected from the group consisting of

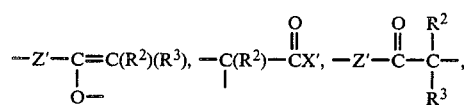

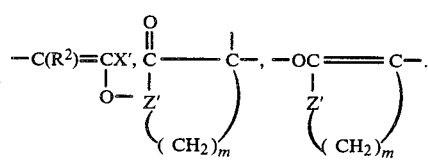

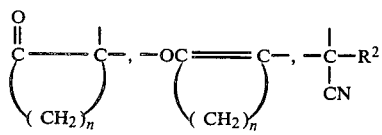

and mixtures thereof, wherein $R^2$, $R^3$, $X'$, $Z'$, m and n are as defined above, provided, however, when $Z^2$ is

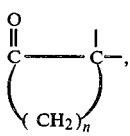

M is Sn or Ge,
(b) $R^2$ and $R^3$ taken together are

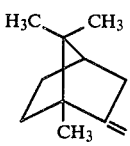

if Z is

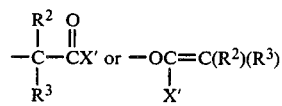

and/or $Z^2$ is

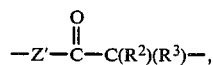

and
(c) $X'$ and either $R^2$ or $R^3$ taken together are

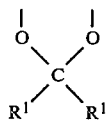

if Z is

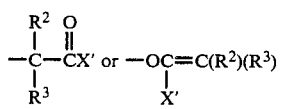

and/or
$Z^2$ is

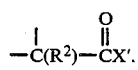

The Lewis base catalyst used in the process of this invention is of the formula selected from $(R^4)_3M'$ and

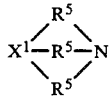

wherein:
M' is P or As;
$X^1$ is

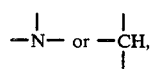

provided however, when the monomer is a nitrile, $X^1$ is

each $R^4$, independently, is $C_{1-12}$ alkyl, $C_{4-12}$ cycloalkyl, $C_{6-12}$ aralkyl or di($C_{1-4}$ alkyl)amino, provided, however, two or three of the alkyl, cycloalkyl and/or aralkyl $R^4$ groups may be joined together by means of one or more carbon-carbon bonds, and provided, however, the alkyl, cycloalkyl and aralkyl groups may contain within aliphatic segments thereof one or more hetero atoms selected from O, N and S and one or more substituents that are unreactive under polymerizing conditions; and each $R^5$ is —CH$_2$CH$_2$—, optionally containing one or more alkyl or other substituents that are unreactive under polymerizing conditions.

Regarding the aforesaid definitions of R, $R^4$ and $R^5$, substituents that are unreactive under polymerizing conditions include those having oxygen-, nitrogen-, or silicon-containing groups which are devoid of reactive hydrogen atoms. Groups such as OSi($R^1$)$_3$ and CONH$_2$ are nonreactive under such conditions and, therefore, can be tolerated. On the other hand, groups such as CO$_2$H and OH are reactive under polymerizing conditions. In order for monomers and/or initiators containing such groups to be useful in the invention process, the groups must be chemically protected, i.e. deactivated. Monomers containing such deactivated groups are useful in the preparation of polymers which, upon treatment to remove the protective group, have functional sites along the polymer chain. Monomers and/or initiators which contain sufficiently sterically hindered amine and alcohol groups that remain inert under reaction conditions may be used directly without deactivation. The functional sites can impart special properties to the polymer products, including curability and photosensitivity.

Catalysts which are specifically exemplified herein include tri-n-butyl phosphine, hexamethyl phosphorous triamide, bis(dimethylamino)methylphosphine, triethyl arsine, quinuclidine and 1,4-diazabicyclo[2.2.2.]octane. Of these, bis(dimethylamino)methylphosphine appears to provide the highest rate of polymerization. The concentration of catalyst employed in the polymerization reaction is in the range 0.001–10 moles per mole of initiator. Preferably, the catalyst concentration is 0.05–1 mole per mole of initiator. The Lewis-base catalysts useful in the present invention process may also be used in the process disclosed in copending application Ser. No. 676,099 in place of the catalysts described therein, as demonstrated in Example 17 herein.

Operable monomer types include those previously recited and also more specifically defined by formula. Whereas the polymers produced by the processes of U.S. Pat. Nos. 4,414,372 and 4,417,034, supra, are described as "living" polymers, the polymers produced by the process of this invention may be living or nonliving. For example, methyl methacrylate, when polymerized by the process of this invention, generally provides a "living" polymer. Although not wishing to be bound by this belief and theory, the structure of the living and growing polymer made by the instant process is believed substantially the same as the polymer of the aforesaid patents, having polymerization reactive ketene silyl acetal end groups.

The process of this invention can be carried out with or without added solvent. Solvents which are useful are those which are inert under polymerizing conditions and include ethers, carbonates, hydrocarbons, and esters which are free of α-hydrogen atoms, for example, methyl benzoate. The reaction appears to proceed best in highly polar aprotic solvents; propylene carbonate is a preferred solvent.

The process of the invention can be carried out over a wide range of temperatures, for example, from about $-80°$ C. to about $90°$ C. Low temperatures provide slower reaction rates and usually are avoided, not only for this reason but also because of the added cost and difficulties which are common to low temperature reactions. Ambient temperature is preferred.

In the following examples, parts and percentages are by weight and temperatures are in degrees Celsius unless otherwise specified. The polydispersity (D) of the polymer product of the examples is defined by $D = \overline{M}_w/\overline{M}_n$, the molecular weights being determined by gel permeation chromatography (GPC). Unless otherwise specified, the "living" polymer products were quenched by exposure to moist air before molecular weights were determined. Monomer conversions were determined by means of NMR (nuclear magnetic resonance) analyses. $T_g$ was determined by differential scanning calorimetry (DSC).

EXAMPLE 1

Polymerization of Methyl Methacrylate (MMA) with [(1-Methoxy-2-methyl-1-propenyl)oxy]trimethylsilane (MTS) and Quinuclidine in Propylene Carbonate Solution To a solution of 1 mL (5 mmol) of [(1-Methoxy-2-methyl-1-propenyl)oxy]trimethylsilane (MTS) and 56 mg (0.5 mmol) of sublimed quinuclidine (1-azabicyclo[2.2.2]octane) in 20 mL of propylene carbonate was added 10.8 mL (100 mmol) of MMA. No exotherm was observed, and the solution was stirred at room temperature for 2.5 days. NMR analysis showed complete conversion to poly(methyl methacrylate) with no residual monomer. GPC showed $\overline{M}_n$ 2550, $\overline{M}_w$ 3200, D=1.26 (theoretical $\overline{M}_n$ 2100). Addition of 5.4 mL (50 mmol) of ethyl acrylate gave no exotherm, no incorporation of ethyl acrylate into the polymer (NMR) and no change in $\overline{M}_n$ or $\overline{M}_w$ (GPC).

EXAMPLE 2

Polymerization of Methyl Methacrylate with MTS and Tri-n-butyl Phosphine in Propylene Carbonate Solution To a solution of 0,87 g (1 mL, 5 mmol) of MTS and 0.1 g (0.12 mL, 0.5 mmol) of distilled tri-n-butyl phosphine in 20 mL of propylene carbonate was added 10 g (10.8 mL, 100 mmol) of methyl methacrylate. The solution was stirred 18 h. NMR analysis of the solution showed 100% conversion to poly(methyl methacrylate). GPC showed $\overline{M}_n$ 1720, $\overline{M}_w$ 5480, D=3.19 (theoretical $\overline{M}_n$ 2100) plus a trace (about 1%) of very high molecular weight polymer.

EXAMPLE 3

Polymerization of Methyl Methacrylate with MTS and Hexamethyl Phosphorous Triamide in Propylene Carbonate Solution with Demonstration that Polymer is "Living"

A. To a solution of 0.87 g (1 mL, 5 mmol) of MTS and 0.18 mL (1 mmol) of hexamethyl phosphorous triamide in 20 mL of propylene carbonate was added 10.8 mL (100 mmol) of MMA. A delayed exotherm took the temperature to 57°. One hour after the end of the exotherm a sample was removed for GPC analysis which showed $\overline{M}_n$ 3990, $\overline{M}_w$ 5810, D=1.46 (theoretical $\overline{M}_n$ 2100), after which 10.8 mL (100 mmol) of MMA was added, producing a slightly delayed exotherm to 53°. After 1 h NMR showed less than 2% residual MMA relative to PMMA. GPC showed $\overline{M}_n$ 6860, $\overline{M}_w$ 8300, D=1.21 (theoretical $\overline{M}_n$ 4100).

B. When the experiment was repeated in the absence of the silicon initiator, MTS, a pale yellow color was observed without any temperature increase. Both NMR and GPC showed the absence of polymer.

EXAMPLE 4

Polymerization of Ethyl Acrylate with MTS and Quinuclidine in Propylene Carbonate Solution To a solution of 0.44 g (0.5 mL, 2.5 mmol) of MTS and 56 mg (0.5 mmol) of quinuclidine in 20 mL of propylene carbonate was added to 10 g (10.8 mL, 100 mmol) of ethyl acrylate (purified by passage over a column of neutral alumina under argon). A slow exothermic reaction occurred giving a 4° rise in temperature during 340 minutes. After stirring for 18 h, NMR analysis showed poly(ethyl acrylate) with a trace of unpolymerized ethyl acrylate. GPC showed $\overline{M}_n$ 7130, $\overline{M}_w$ 15,200, D=2.13 (theoretical $\overline{M}_n$ 4100). Addition of 5 g of ethyl acrylate gave no exotherm, and after 18 h, no additional incorporation of ethyl acrylate, as evidenced by GPC which showed no increase in molecular weight.

EXAMPLE 5

Polymerization of Ethyl Acrylate with MTS and Quinuclidine in Dimethylacetamide Solution To a solution of 0.44 g (0.5 mL, 2.5 mmol) of MTS and 56 mg (0.5 mmol) of quinuclidine in 20 mL of N,N-dimethylacetamide was added 10 g (10.8 mL, 100 mmol) of ethyl acrylate. A slight temperature rise was observed; the solution was stirred for 18 h. NMR analysis showed 33% conversion to poly(ethyl acrylate). GPC showed $\overline{M}_n$ 1420, $\overline{M}_w$ 2840, D=2.00 (theoretical $\overline{M}_n$ for 33% conversion, 1353).

EXAMPLE 6

Polymerization of Ethyl Acrylate with MTS and Tributyl Phosphine in Tetrahydrofuran Solution To a solution of 0.44 g (0.5 mL, 2.5 mmol) of MTS and 0.1 mg (0.12 mL, 0.5 mmol) of tributyl phosphine in 20 mL of tetrahydrofuran was added 10 g (10.8 mL, 100 mmol) of ethyl acrylate. A temperature rise of 11° occurred during 32 minutes. After stirring for 18 h, GPC analysis showed $\overline{M}_n$ 4530, $\overline{M}_w$ 7980, D=1.76 (theoretical $\overline{M}_n$ for 89% conversion, 3700). Evaporation gave 9.5 g of viscous poly(ethyl acrylate) containing 6% monomer; yield 89%.

EXAMPLE 7

Polymerization of Methyl Methacrylate with MTS and Bis(dimethylamino)methylphosphine in Propylene Carbonate Solution The procedure of Example 1 was used with 0.12 g (1 mmol) of bis(dimethylamino)methylphosphine instead of quinuclidine. The resulting exothermic reaction gave a temperature increase of approximately 11° during the addition of the methyl methacrylate. One hour after the exotherm was over, a sample was removed for analysis. NMR showed 100% conversion to poly(methyl methacrylate) with a 1:1 ratio of syndiotactic to heterotactic sequences. GPC showed $\overline{M}_n$ 1980, $\overline{M}_w$ 3090, D=1.56 (theoretical $\overline{M}_n$ 2100). The addition of 5 g of methyl methacrylate produced another exotherm. A sample was removed for analysis. NMR showed 100% conversion to poly(methyl methacrylate). GPC showed $\overline{M}_n$ 3100, $\overline{M}_w$ 4690, D=1.51 (theoretical $\overline{M}_n$ 3100), indicating that the polymer was "living".

EXAMPLE 8

Polymerization of Ethyl Acrylate with MTS and Bis(dimethylamino)methylphosphine in Propylene Carbonate Solution The procedure of Example 7 was followed, using additions of 10 g and 5 g of ethyl acrylate instead of methyl methacrylate. After the first addition of monomer, NMR showed approximately 50% conversion to poly(ethyl acrylate), $\overline{M}_n$ 1480, $\overline{M}_w$ 6100, D=4.13 (theoretical $\overline{M}_n$ for 50% conversion, 1100). There was little incorporation of additional monomer following the second addition of ethyl acrylate, $\overline{M}_n$ 1600, $\overline{M}_w$ 6590, D=4.12.

EXAMPLE 9

Preparation of Poly(methyl methacrylate) with a Terminal Hydroxyl Group by Polymerization of Methyl Methacrylate with [(1-[2-Trimethylsiloxy]ethoxy-2-methyl-1-propenyl)oxy]trimethylsilane (TTS) and Bis(dimethylamino)methylphosphine To a solution of 1.4 g (1.5 mL, 5 mmol) of [(1-[2-trimethylsiloxy]ethoxy-2-methyl-1-propenyl)oxy]trimethylsilane (TTS) and 0.12 g (0.127 mL, 1 mmol) of bis(dimethylamino)methylphosphine in 15 mL of propylene carbonate was added 10 g (10.8 mL, 100 mmol) of methyl methacrylate. A delayed exotherm carried the temperature to 60°. NMR analysis showed 100% conversion to poly(methyl methacrylate), $\overline{M}_n$ 2160, $\overline{M}_w$ 11,200, D=5.21 (theoretical $\overline{M}_n$ 2200).

The polymer was precipitated with water, dissolved in 20 mL of tetrahydrofuran, treated with 6 mL of methanol and 1 mL of 1M tetrabutylammonium fluoride/tetrahydrofuran and refluxed for 1 h. The solution was evaporated in vacuo and the residue was dissolved in methylene chloride, washed with water, dried (MgSO$_4$) and evaporated. NMR analysis of the residue showed complete removal of the trimethylsilyl groups. HPLC analysis (elution with ethyl acetate) showed that 97.6% of the polymer was poly(methyl methacrylate) with one terminal hydroxyl group, retention time 1.91 minutes, and 2.4% poly(methyl methacrylate), retention time 1.39 minutes. The retention times were in agreement with those of a control sample containing a mixture of the two polymers prepared independently. Thus, nearly all of the polymer had an end-group derived from the ketene silyl acetal.

EXAMPLE 10

Preparation of Poly(methyl methacrylate) with a Terminal Hydroxyl Group by Polymerization of Methyl Methacrylate with TTS and 1,4-Diazabicyclo[2.2.2.]octane in Propylene Carbonate Solution The procedure of Example 9 was followed, except that 56 mg (0.5 mmol) of 1,4-diazabicyclo[2.2.2.]octane (purified by sublimation through calcium hydride) in 20 mL of propylene carbonate was used instead of bis(dimethylamino)methylphosphine. No exotherm was observed; the reaction mixture was stirred 18 h. Analysis showed 100% conversion to polymer with $\overline{M}_n$ 2600, $\overline{M}_w$ 4060, D=1.56 (theoretical $\overline{M}_n$ 2130). HPLC analysis showed 97.6% ω-hydroxypoly(methyl methacrylate) and 2.4% poly(methyl methacrylate).

EXAMPLE 11

Preparation of Poly(methyl methacrylate) with Terminal Hydroxyl Groups by Polymerization of Methyl Methacrylate with TTS and Quinuclidine The procedure of Example 9 was followed, except that 56 mg (0.5 mmol) of quinuclidine in 20 mL of propylene carbonate was used instead of bis(dimethylamino)methylphosphine. The reaction was stirred 18 h. Analysis showed 100% conversion to polymer with $\overline{M}_n$ 3690, $\overline{M}_w$ 5860, D=1.59 (theoretical $\overline{M}_n$ 2130). HPLC analysis showed 88.4% ω-hydroxypoly(methyl methacrylate) and 11.6% α,ω-dihydroxypoly(methyl methacrylate).

EXAMPLE 12

Preparation of Poly(methyl methacrylate) with Terminal Hydroxyl Groups by Polymerization of Methyl Methacrylate with TTS and Triethyl Arsine To a solution of 1.4 g (1.5 mL, 5 mmol) of TTS and 0.08 g (0.5 mmol) of triethyl arsine in 20 mL of propylene carbonate was added 10 g (10.8 mL, 100 mmol) of methyl methacrylate. After about 0.5 h, a rapid exotherm occurred and the temperature rose to 63°. The reaction mixture was stirred for 18 h and a sample was removed for analysis. NMR showed 100% conversion to polymer; GPC showed $\overline{M}_n$ 2550, $\overline{M}_w$ 4150, D=1.63 (theoretical $\overline{M}_n$ 2200). Then 5.0 g of methyl methacrylate was added. After 5 h analysis showed little additional incorporation of monomer, with most of the additional monomer remaining unpolymerized. GPC showed $\overline{M}_n$ 2730, $\overline{M}_w$ 4520, D=1.66 (theoretical $\overline{M}_n$ 3200). The polymer was isolated and analyzed by HPLC as in Example 9. The polymer consisted of 0.74% poly(methyl methacrylate), 43% ω-hydroxypoly(methyl methacrylate) and 56% α,ω-dihydroxypoly(methyl methacrylate).

EXAMPLE 13

Preparation of Poly(methacrylonitrile) with a Terminal Hydroxyl Group with TTS and Bis(dimethylamino)methylphosphine To a solution of 1.4 g (1.5 mL, 5 mmol) of TTS and 0.12 g (0.127 mL, 1 mmol) of bis(dimethylamino)methylphosphine in 20 mL of propylene carbonate was added 10 g (12.6 mL, 150 mmol) of methacrylonitrile (purified by passage through a column of neutral alumina under argon). The temperature rose 13° during monomer addition and then gradually fell while viscosity increased. After 18 h NMR analysis showed 100% conversion to polymer. From 12 mL of the reaction mixture, polymer was isolated by precipitation with 4:1 methanol-water. The polymer was stirred for 1 h at 60° with a mixture of dimethylformamide, methanol, and 1 mL of 1M tetrabutylammonium fluoride/tetrahydrofuran and precipitated with 4:1 methanol-water. GPC showed $\overline{M}_n$ 4520, $\overline{M}_w$ 7150, D=1.58 (theoretical $\overline{M}_n$ 2140); DSC $T_g$ 94°.

EXAMPLE 14

Polymerization of Acrylonitrile with TTS and Bis(dimethylamino)methylphosphine in Propylene Carbonate Solution This example provides a comparison of the invention process and a process within the state of the art.

A. To a solution of 1.4 g (1.5 mL, 5 mmol) of TTS and 0.12 g (0.127 mL, 1 mmol) of bis(dimethylamino)methylphosphine in 20 mL of propylene carbonate was added 7.95 g (9.9 mL, 150 mmol) of acrylonitrile (purified by passage over a column of neutral alumina under argon). A slow exotherm produced a 12° increase in temperature. The viscosity gradually increased and some separation of polymer occurred. After 18 h addition of 5 mL of acrylonitrile produced no exotherm. Precipitation with 4:1 methanol-water gave 6.1 g (77% yield) of polyacrylonitrile as an off-white powder; $\eta_{inh}$ 0.147 (DMF, 25°). A maximum degree of polymerization (d.p.) of 83 can be estimated from the $^1$H NMR spectrum of the product by comparison of the intensities of the terminal Me$_3$SiO group (from the original trimethylsiloxyethoxy group in the initiator) and the —CHCN group of the polymer backbone.

B. The procedure of Part A was followed, except that no TTS was added. A smaller exotherm was observed than in Part A, and no insoluble polymer precipitated. NMR analysis of the solution showed only 58% conversion of the acrylonitrile. Precipitation of polymer by the procedure of Part A gave only 1.5 g of polyacrylonitrile; $\eta_{inh}$ 0.106 (DMF, 25°).

EXAMPLE 15

Polymerization of Ethyl Acrylate with MTS and Hexamethyl Phosphorous Triamide in Heptane Solution To a mechanically stirred solution of 0.435 g (0.5 mL, 2.5 mmol) of MTS and 0.45 mL (2.5 mmol) of hexamethyl phosphorous triamide in 30 mL of heptane was added 20 g (21.6 mL, 200 mmol) of ethyl acrylate. When about half of the monomer had been added, a rapid exotherm caused the temperature to rise to 75°. The temperature slowly fell as the remaining monomer was added. When the temperature had reached 29°, 2 mL of ethyl acrylate was added, producing no exotherm. The solvent was decanted from the polymer, which was then dissolved in methylene chloride containing 2 mL of methanol. Evaporation gave 18 g (90% conversion of original charge) of poly(ethyl acrylate). GPC showed $\overline{M}_n$ 5030, $\overline{M}_w$ 12,200, D=2.42 (theoretical $\overline{M}_n$ for 90% conversion, 7200).

EXAMPLE 16

Polymerization of Methyl Methacrylate with MTS and Hexamethyl Phosphorous Triamide in Tetrahydrofuran Solvent The procedure of Example 3 was followed using 20 mL of tetrahydrofuran instead of propylene carbonate, and a reaction period of 2.5 days. No exotherm was observed. There was a 47% conversion to poly(methyl methacrylate); GPC showed $\overline{M}_n$ 911, $\overline{M}_w$ 2240, D=2.46 (theoretical $\overline{M}_n$ for 47% conversion, 985).

EXAMPLE 17

Chain Transfer with α-Methylbenzyl Cyanide in the Polymerization of Methyl Methacrylate Initiated With MTS and Catalyzed with Bis(dimethylamino)methylphosphine To a stirred solution of 0.2 mL (1 mmol) of MTS and 26 μL (0.2 mmol) of bis(dimethylamino)methylphosphine in 10 mL of propylene carbonate at 50° was added a solution of 0.664 mL (5 mmol) of α-methylbenzyl cyanide in 10 g (10.8 mL, 100 mmol) of MMA. After the addition was complete, a slow exotherm caused the temperature to rise slowly to 60° and then more rapidly to 72°. Precipitation into aqueous methanol gave 10.1 g of poly(methyl methacrylate), $\overline{M}_n$ 1590, $\overline{M}_w$ 5690, $D=3.52$ (theoretical $\overline{M}_n$, no transfer 10,100; 100% transfer 1700). The NMR spectrum of the polymer showed 23 MMA units per terminal aromatic ring derived from the chain transfer agent, α-methylbenzyl cyanide, indicating that chain transfer occurred.

I claim:

1. Polymerization process comprising contacting under polymerizing conditions at least one polar monomer with (i) a tetracoordinate organosilicon, organotin or organogermanium polymerization initiator having at least one initiating site, and (ii) a co-catalyst which is a suitable Lewis base, to produce polymer having repeat units of the monomer.

2. Process of claim 1 wherein the catalyst is the Lewis base of the formula selected from $(R^4)_3M'$ and

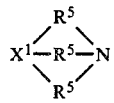

wherein:
M' is P or As;
$X^1$ is

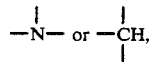

provided however, when the monomer is a nitrile, $X^1$ is

each $R^4$, independently, is $C_{1-12}$ alkyl, $C_{4-12}$ cycloalkyl, $C_{6-12}$ aralkyl or di($C_{1-4}$ alkyl)amino, provided, however, two or three of the alkyl, cycloalkyl and/or aralkyl $R^4$ groups may be joined together by means of one or more carbon-carbon bonds, and provided, however, the alkyl, cycloalkyl and aralkyl groups may contain one or more hetero atoms selected from O, N and S and may contain one or more substituents that are unreactive under polymerizing conditions; and each $R^5$ is —CH$_2$CH$_2$—, optionally containing one or more alkyl or other substituents that are unreactive under polymerizing conditions.

3. Process of claim 2 wherein the monomer is of the formula $CH_2=C(Y)X$ wherein:
X is —CN, —CH=CHC(O)X' or —C(O)X';
Y is —H, —CH$_3$, —CN or —CO$_2$R, provided, however, when X is —CH=CHC(O)X', Y is —H or —CH$_3$;
X' is —OSi($R^1$)$_3$, —R, —OR or —NR'R";
each $R^1$, independently, is H or a hydrocarbyl radical which is an aliphatic, alicyclic, aromatic or mixed aliphatic-aromatic radical containing up to 20 carbon atoms, provided that at least one $R^1$ group is not H;
R is a hydrocarbyl radical which is an aliphatic, alicyclic, aromatic or mixed aliphatic-aromatic radical containing up to 20 carbon atoms, or a polymeric radical containing at least 20 carbon atoms, any of said radicals optionally containing one or more ether oxygen atoms within aliphatic segments thereof, optionally containing one or more functional substituents that are unreactive under polymerizing conditions, and optionally containing one or more reactive substituents of the formula —Z'—(O)C—C($Y^1$)=CH$_2$ wherein $Y^1$ is H or CH$_3$ and Z' is O or NR'; and each of R' and R" is independently selected from $C_{1-4}$ alkyl.

4. Process of claim 3 wherein the initiator is of the formula selected from $(R^1)_3MZ$, $(R^1)_2M(Z^1)_2$ and $O[M(R^1)_2Z^1]_2$ wherein:
$R^1$ is as defined above for the monomer;
Z is an activating substituent selected from the group consisting of

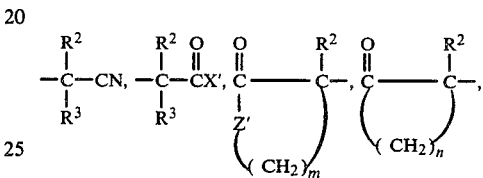

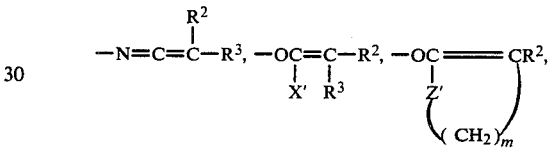

—SR, —OP(NR'R")$_2$, —OP(OR$^1$)$_2$, —OP-[OSi($R^1$)$_3$]$_2$ and mixtures thereof wherein R, $R^1$, R', R", X' and Z' are as defined above;
$Z^1$ is the activating substituent

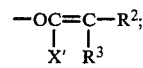

m is 2, 3 or 4;
n is 3, 4 or 5;
M is Si, Sn or Ge, provided, however, when Z is

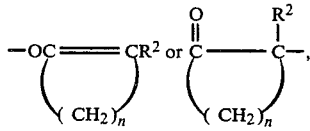

m is Sn or Ge; and
each of $R^2$ and $R^3$ is independently selected from H and hydrocarbyl, defined as for R above;
(a) at least one of any R, $R^2$ and $R^3$ in the initiator optionally containing one or more initiating substituents of the formula —$Z^2$—M($R^1$)$_3$ wherein
M and $R^1$ are as defined above;
$Z^2$ is an activating diradical selected from the group consisting of

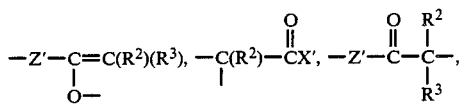

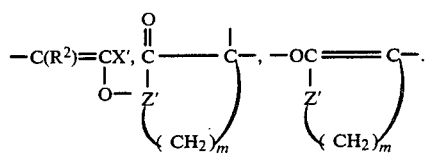

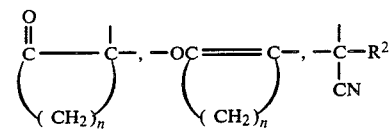

and mixtures thereof, wherein $R^2$, $R^3$, $X'$, $Z'$, m and n are as defined above, provided, however, when $Z^2$ is

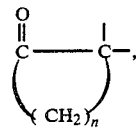

M is Sn or Ge, (b) $R^2$ and $R^3$ taken together are

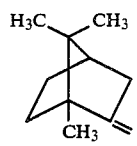

if Z is

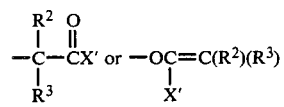

and/or $Z^2$ is

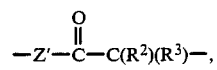

and (c) $X'$ and either $R^2$ or $R^3$ taken together are

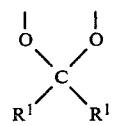

if Z is

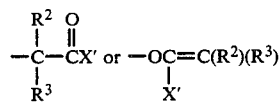

and/or $Z^2$ is

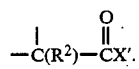

5. Process of claim 4 wherein M is Si.

6. Process of claim 1 wherein the polymer produced is "living" polymer.

7. Process of claim 1 wherein the monomer is methyl methacrylate.

8. Process of claim 1 wherein the catalyst is bis(dimethylamino)methylphosphine.

9. Process of claim 1 wherein the catalyst is quinuclidine.

10. Process of claim 1 wherein the catalyst is hexamethylphosphoramide.

11. Process of claim 1 wherein an alkylene carbonate is employed as a solvent.

12. Process of claim 11 wherein the solvent is propylene carbonate.

* * * * *